US009059435B2

(12) United States Patent
Scott et al.

(10) Patent No.: US 9,059,435 B2
(45) Date of Patent: Jun. 16, 2015

(54) MEDICAL DEVICE BATTERY ENCLOSURE

(71) Applicants: Erik R. Scott, Maple Grove, MN (US);
Prabhakar A. Tamirisa, Brooklyn Park, MN (US)

(72) Inventors: Erik R. Scott, Maple Grove, MN (US);
Prabhakar A. Tamirisa, Brooklyn Park, MN (US)

(73) Assignee: Medtronic, Inc., Minneapolis, MN (US)

( * ) Notice: Subject to any disclaimer, the term of this patent is extended or adjusted under 35 U.S.C. 154(b) by 49 days.

(21) Appl. No.: 13/749,747

(22) Filed: Jan. 25, 2013

(65) Prior Publication Data
US 2013/0196214 A1 Aug. 1, 2013

Related U.S. Application Data
(60) Provisional application No. 61/591,702, filed on Jan. 27, 2012.

(51) Int. Cl.
H01M 2/08 (2006.01)
H01M 2/02 (2006.01)
H01M 10/052 (2010.01)

(52) U.S. Cl.
CPC ............ *H01M 2/022* (2013.01); *H01M 2/0202* (2013.01); *H01M 2/0287* (2013.01); *H01M 10/052* (2013.01); *H01M 2220/30* (2013.01)

(58) Field of Classification Search
None
See application file for complete search history.

(56) References Cited

U.S. PATENT DOCUMENTS

| 5,769,874 | A  | * | 6/1998  | Dahlberg          | 607/36   |
| 6,008,980 | A  |   | 12/1999 | Stevenson et al.  |          |
| 6,080,508 | A  |   | 6/2000  | Dasgupta et al.   |          |
| 6,291,102 | B1 |   | 9/2001  | Yoshida et al.    |          |
| 6,512,666 | B1 |   | 1/2003  | Duva              |          |
| 7,285,334 | B1 |   | 10/2007 | Yamashita et al.  |          |
| 7,556,885 | B2 |   | 7/2009  | Yamada et al.     |          |
| 7,579,106 | B2 | * | 8/2009  | Haas et al.       | 429/80   |
| 2002/0048704 | A1 |   | 4/2002  | Murai et al.    |          |
| 2002/0161404 | A1 | * | 10/2002 | Schmidt         | 607/2    |
| 2005/0107870 | A1 | * | 5/2005  | Wang et al.     | 623/1.44 |
| 2005/0259840 | A1 | * | 11/2005 | Gable et al.    | 381/323  |
| 2007/0116910 | A1 | * | 5/2007  | Polykarpov et al. | 428/35.2 |
| 2007/0207376 | A1 |   | 9/2007  | Call et al.     |          |
| 2008/0085451 | A1 | * | 4/2008  | Freitag et al.  | 429/174  |
| 2008/0187829 | A1 | * | 8/2008  | Brand           | 429/185  |
| 2009/0162748 | A1 | * | 6/2009  | Fan et al.      | 429/175  |
| 2013/0026969 | A1 | * | 1/2013  | Kim et al.      | 320/103  |

* cited by examiner

Primary Examiner — Patrick Ryan
Assistant Examiner — Jose Colucci Rios

(57) ABSTRACT

In one example, the disclosure is directed to a medical device comprising an outer housing and a battery within the outer housing, where the battery is configured to supply power to one or more electronic components of the medical device. The battery comprises a first electrode, a second electrode, an electrolyte, and a multilayer battery enclosure. The multilayer battery enclosure comprises a substantially cylindrical member including a continuous multilayer body defining a cavity between a first end and a second end, and wherein at least one of the first end and second end are sealed to enclose the first electrode, second electrode, and the electrolyte within the cavity of the multilayer battery enclosure.

19 Claims, 7 Drawing Sheets

MEDICAL DEVICE BATTERY ENCLOSURE

TECHNICAL FIELD

The disclosure relates to batteries and, more particularly, to batteries of medical devices.

BACKGROUND

Medical devices such as implantable medical devices (IMDs) include a variety of devices that deliver therapy (such as electrical simulation or drug delivery) to a patient, monitor a physiological parameter of a patient, or both. IMDs typically include a number of functional components encased in a housing. The housing is implanted in a body of the patient. For example, the housing may be implanted in a pocket created in a torso of a patient. The housing may include various internal components such as batteries and capacitors to deliver energy for therapy delivered to a patient and/or monitoring a physiological parameter of a patient.

SUMMARY

In general, the disclosure is directed to a battery for a medical device, such as an IMD, and techniques for manufacturing the battery. The battery may be positioned within a housing of the IMD to provide, e.g., energy for therapy delivered to a patient and/or monitoring a physiological parameter of a patient. The battery may include electrodes (anode and cathode), and electrolyte material enclosed within a multilayer battery enclosure. In some examples, the multilayer battery enclosure may be formed from a substantially cylindrical member including a substantially continuous (e.g., seamless) body defining a cavity between two ends. The battery enclosure may be used to physically separate the electrolyte and electrodes of the battery from other components within the IMD housing.

In some examples, the multilayer battery enclosure may comprise a substantially cylindrical member including a continuous multilayer body defining a cavity between two open ends that are subsequently sealed to enclose the electrodes and electrolyte material, resulting in a battery enclosure having only two sealed ends separated by the seamless, multilayer body. In another example, the multilayer battery enclosure may comprise a substantially cylindrical member including a continuous multilayer body defining a cavity and having only a single open end, with the second end being integral and continuous (e.g., seamless) with the body. In such cases, the battery enclose may be described as having a "pouch-like shape," in which the resulting battery enclosure only requires a single sealed end to enclose the electrolyte and electrodes within the battery enclosure.

In one aspect, the disclosure is directed to a battery comprising a first electrode; a second electrode; an electrolyte; and a multilayer battery enclosure, wherein the multilayer battery enclosure comprises a substantially cylindrical member including a continuous multilayer body defining a cavity between first and second ends, and wherein at least one of the first end and second end are sealed to enclose the first electrode, second electrode, and the electrolyte within the cavity of the multilayer battery enclosure.

In another aspect, the disclosure is directed to a medical device comprising an outer housing; and a battery within the outer housing, wherein the battery is configured to supply power to one or more electronic components of the medical device, wherein the battery comprises a first electrode, a second electrode, an electrolyte, and a multilayer battery enclosure, wherein the multilayer battery enclosure comprises a substantially cylindrical member including a continuous multilayer body defining a cavity between first and second ends, and wherein at least one of the first end and second end are sealed to enclose the first electrode, second electrode, and the electrolyte within the cavity of the multilayer battery enclosure.

In another aspect, the disclosure is directed to a method comprising inserting a first electrode, second electrode, and electrolyte into a cavity of a multilayer battery enclosure, wherein the multilayer battery enclosure comprises a substantially cylindrical member including a continuous multilayer body defining the cavity between first and second ends, where at least one of the first end and second end defines an opening into the cavity; and sealing the opening into the cavity to enclose the first electrode, second electrode, and electrolyte within the enclosure.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
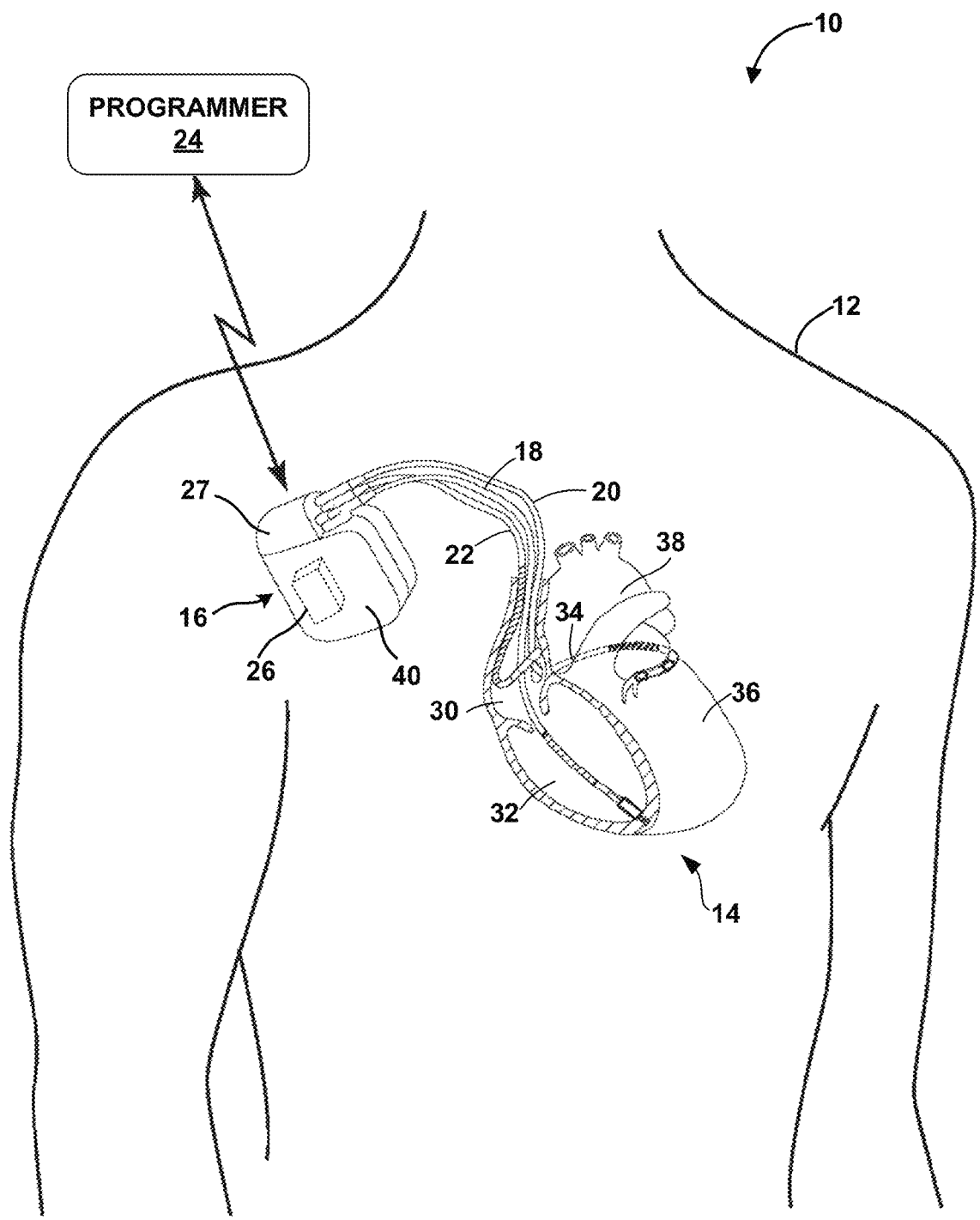
FIG. 1 is a conceptual diagram that illustrates an example therapy system that may be used to deliver therapy to a patient.

In general, the disclosure is directed to battery for a medical device, such as, e.g., an IMD. IMDs include a variety of devices that deliver therapy (such as electrical simulation therapy or drug delivery therapy) to a patient, monitor a physiological parameter of a patient, or both. IMDs may include a number of functional components encased in a housing. For example, a battery may be positioned within a housing of the IMD to supply energy for therapy delivered to a patient and/or monitoring one or more physiological parameters of a patient. The battery may include electrodes and an electrolyte enclosed within a battery enclosure, which separates the internal components of the battery from the interior of the IMD housing.

In some examples, a battery enclosure may be formed by placing two similar sized metallic foil sheets including a heat sealable inner layer (e.g., a layer that is compatible with the electrolyte), an aluminum intermediate layer, and a nylon outer layer. The foil sheets may be sealed (e.g., heat sealed) around the entire perimeter of the sheets to enclose the electrodes and electrolyte of the battery enclosure. In other examples, a single foil sheet may be folded in half and then sealed on the three remaining edges to enclose the electrodes and electrolyte in the battery enclosure.

However, as the amount of seams associated with the sealed portions of the battery enclosure increases, the energy density of a battery decreases. Such a decrease in energy density may be undesirable in cases in which it is desirable to minimize the overall size of IMD. Moreover, use of such multilayer sheets may be not allow for flexibility in the shape of the battery enclosure beyond that of a substantially flat, rectangular enclosure. In accordance with one or more examples of the disclosure, a multilayer battery enclosure may be formed from a substantially cylindrical member including a substantially continuous (e.g., seamless) body, defining a cavity between two ends. The battery enclosure may be used to physically separate the electrolyte and electrodes of the battery from other components within the IMD housing.

In some examples, the multilayer battery enclosure may comprise a substantially cylindrical member including a continuous multilayer body defining a cavity and two open ends that are subsequently sealed to enclose the electrodes and electrolyte material, resulting in a battery enclosure having only two sealed ends separated by the seamless, multilayer body. In another example, the multilayer battery enclosure may comprise a substantially cylindrical member including a continuous multilayer body defining a cavity and a single open end, with the second end being integral and continuous (e.g., seamless) with the body. In such cases, the battery enclosure may be described as having a "pouch-like shape," in which the resulting battery enclosure only requires a single sealed end to enclose the electrolyte and electrodes within the battery enclosure. In each case, an open end of such battery enclosures may be sealed, for example, by sealing or otherwise bonding the opposing surfaces of the open end to one another. As another example, an open end of such battery enclosures may be sealed using an end cap configured to be bonded to the cylindrical member to cover the open end.

In this manner, the relative amount of seams resulting from the sealing of portions of the battery enclosure may be minimized or otherwise decreased, thereby providing for an increase in the energy density of the battery, e.g., as compared to a battery enclosure having the same size and shape but formed using one or more foil sheets as described above. Moreover, depending on the properties the substantially cylindrical battery enclosures described herein, a battery enclosures may be formed to have, for example, a tubular or otherwise cylindrical shape, rather than a substantially flat shape. However, in some examples, the substantially cylindrical battery enclosures may also be used to form a substantially flat battery enclosure.

The layer of the multilayer battery enclosure may be formed of any suitable material. In some examples, one or more of the layers (e.g., the inner-most layer) may be formed of a material that is substantially impermeable to the electrolyte used in the battery. As another example, one or more of the layers (e.g., an outer layer) may be formed of a material that is substantially impermeable to the moisture and oxygen. Other layers may be provided to increase the strength and/or other physical properties of the battery enclosure. In some examples, a bond layer may be employed for adhere two adjacent layers to each other.

The multilayer battery enclosures described herein may be fabricated using any suitable technique. In some examples, suitable materials may be coextruded to form a multilayer, substantially cylindrical structure having a hollow center. Such a multilayer structure may be used to form a single multilayer battery enclosure initially having first and second open ends that may be sealed, or the structure may be later cut to form a plurality of such battery enclosure having the same or varying lengths. In some examples, the coextruded substantially cylindrical structure may be blow-molded to form a battery enclosure having on a single open end (e.g., a pouch-like battery enclosure) for sealing after the electrodes and electrolyte have been introduced into the cavity of the battery enclosure.

Figure 2:
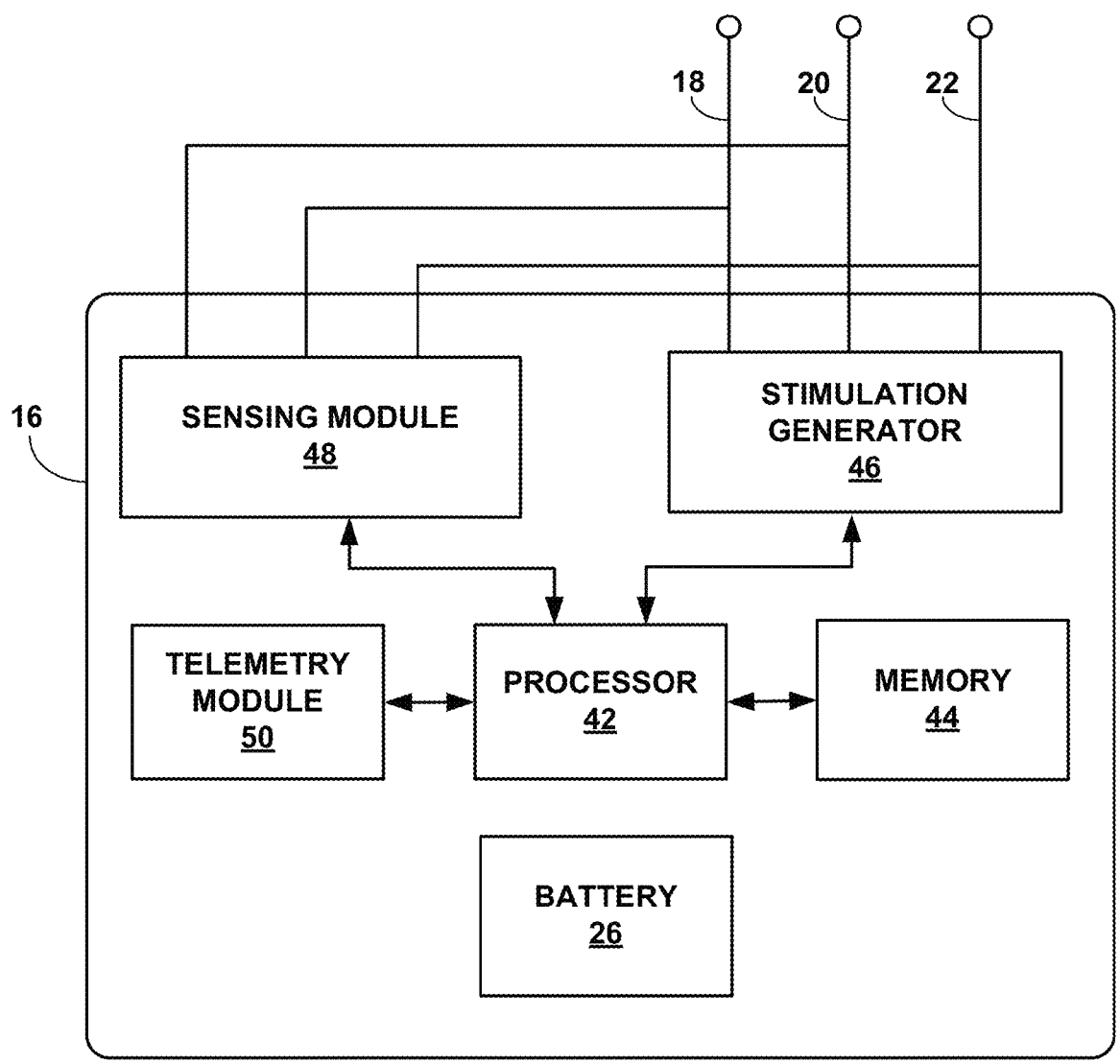
FIG. 2 is a schematic diagram illustrating components of one example IMD.

FIG. 1 is a conceptual diagram that illustrates an example therapy system 10 that may be used to provide therapy to patient 12. Patient 12 ordinarily, but not necessarily, will be a human. Therapy system 10 may include IMD 16 and programmer 24. In the example illustrated in FIG. 1, IMD 16 includes battery 26 positioned within housing 40 of IMD 16. FIG. 2 is a schematic diagram illustrating example components of IMD 16. As will be described below, battery 26 includes battery enclosure 58 in accordance with one or more examples of the disclosure.

While the examples in the disclosure are primarily directed to battery 26 employed in IMD 16, in other examples, battery 26 may be utilized with other implantable medical devices. For example, battery 26 may be utilized with an implantable drug delivery device, an implantable monitoring device that monitors one or more physiological parameter of patient 12, an implantable neurostimulator (e.g., a spinal cord stimulator, a deep brain stimulator, a pelvic floor stimulator, a peripheral nerve stimulator, or the like), a cardiac or neurological lead, or the like. In general, battery 26 may be attached to or implanted proximate to any medical device configured to be implanted in a body of a patient 12.

Moreover, while examples of the disclosure are primarily described with regard to implantable medical devices, examples are not limited as such. Rather, examples of the batteries described herein may be employed in any medical device including non-implantable medical devices. For example, an example battery may be employed to supply power to a medical device configured delivery therapy to a patent externally or via a transcutaneoulsy implanted lead or drug delivery catheter.

In the example depicted in FIG. 1, IMD 16 is connected (or "coupled") to leads 18, 20, and 22. IMD 16 may be, for example, a device that provides cardiac rhythm management therapy to heart 14, and may include, for example, an implantable pacemaker, cardioverter, and/or defibrillator that provides therapy to heart 14 of patient 12 via electrodes coupled to one or more of leads 18, 20, and 22. In some examples, IMD 16 may deliver pacing pulses, but not cardioversion or defibrillation shocks, while in other examples, IMD 16 may deliver cardioversion or defibrillation shocks, but not pacing pulses. In addition, in further examples, IMD 16 may deliver pacing pulses, cardioversion shocks, and defibrillation shocks.

IMD 16 may include electronics and other internal components necessary or desirable for executing the functions associated with the device. For example, as shown in FIG. 2, in addition to battery 26, IMD 16 may include processor 42, memory 44, electrical stimulation generator 46, sensing module 48 and telemetry module 50. Memory 44 of IMD 16 may include computer-readable instructions that, when executed by processor 42 of IMD 16, may cause it to perform various functions attributed to the device herein. For example, processor 42 of IMD 16 may control stimulation generator 46 and sensing module 48 according to instructions and/or data stored on memory to deliver therapy to patient 12 and perform other functions related to treating condition(s) of the patient with IMD 16.

Stimulation generator 46 of IMD 16 may generate electrical stimulation that is delivered to patient 12 via electrode(s) on one or more of leads 18, 20, and 22, in order to provide (e.g., cardiac sensing, pacing signals, or cardioversion/defibrillation shocks). Sensing module 48 of IMD 16 may monitor electrical signals from electrode(s) on leads 18, 20, and 22 of IMD 16 in order to monitor electrical activity of heart 14. In one example, sensing module 48 may include a switch module to select which of the available electrodes on leads 18, 20, and 22 of IMD 16 are used to sense the heart activity. Additionally, sensing module 48 of IMD 16 may include multiple detection channels, each of which includes an amplifier, as well as an analog-to-digital converter for digitizing the signal received from a sensing channel (e.g., electrogram signal processing by a processor of the IMD).

Telemetry module 50 of IMD 16 may include any suitable hardware, firmware, software or any combination thereof for communicating with another device, such as programmer 24 (FIG. 1). Under the control of processor 42 of IMD 16, telemetry module 50 may receive downlink telemetry from and send uplink telemetry to programmer 24 with the aid of an antenna, which may be internal and/or external.

The various electrical components of IMD 16 may be coupled to battery 26, which may include a rechargeable or non-rechargeable battery. A non-rechargeable battery may be capable of holding a charge for several years, while a rechargeable battery may be inductively charged from an external device (e.g., on a daily or weekly basis). In general, battery 26 may supply power to one or more electrical components of IMD 16, such as, e.g., processor 42, telemetry module 50, stimulation generator 48 and/or sensing module 48, to allow IMD 16 to deliver therapy to patient 12, e.g., in the form of monitoring one or more patient parameters and/or delivery of electrical stimulation.

As will be described further below, battery 26 may include a multilayer battery enclosure which encloses, e.g., the electrodes and electrolyte of battery 26. The multilayer battery enclosure may be formed from a substantially cylindrical member including a substantially continuous (e.g., seamless) body defining a cavity between two ends. The battery enclosure may be used to physically separate the electrolyte and electrodes of battery 26 from other components within housing 40 of IMD 16. In some examples, only a single end of the battery enclosure is sealed with the other end being continuous (e.g., seamless) with the body between the two ends, e.g., in the case of the battery enclosure initially having a pouch-like shape. In other examples, both ends of the battery enclosure may be initially open and subsequently sealed to enclose the electrodes and electrolyte of battery 26.

In the example of FIG. 1, leads 18, 20, 22 that are coupled to IMD 16 may extend into heart 14 of patient 12 to sense electrical activity of heart 14 and/or deliver electrical stimulation to heart 14. In the example shown in FIG. 1, right ventricular (RV) lead 18 extends through one or more veins (not shown), the superior vena cava (not shown), and right atrium 30, and into right ventricle 32. Left ventricular (LV) coronary sinus lead 20 extends through one or more veins, the vena cava, right atrium 30, and into the coronary sinus 34 to a region adjacent to the free wall of left ventricle 36 of heart 14. Right atrial (RA) lead 22 extends through one or more veins and the vena cava, and into the right atrium 30 of heart 14. In other examples, IMD 16 may deliver stimulation therapy to heart 14 by delivering stimulation to an extravascular tissue site in addition to or instead of delivering stimulation via electrodes of intravascular leads 18, 20, 22. In the illustrated example, there are no electrodes located in left atrium 36. However, other examples may include electrodes in left atrium 36.

IMD 16 may sense electrical signals attendant to the depolarization and repolarization of heart 14 (e.g., cardiac signals) via electrodes (not shown in FIG. 1) coupled to at least one of the leads 18, 20, and 22. In some examples, IMD 16 provides pacing pulses to heart 14 based on the cardiac signals sensed within heart 14. The configurations of electrodes used by IMD 16 for sensing and pacing may be unipolar or bipolar. IMD 16 may also deliver defibrillation therapy and/or cardioversion therapy via electrodes located on at least one of the leads 18, 20, and 22. IMD 16 may detect arrhythmia of heart 14, such as fibrillation of ventricles 32 and 36, and deliver defibrillation therapy to heart 14 in the form of electrical shocks. In some examples, IMD 16 may be programmed to deliver a progression of therapies (e.g., shocks with increasing energy levels), until a fibrillation of heart 14 is stopped. IMD 16 may detect fibrillation by employing one or more fibrillation detection techniques known in the art. For example, IMD 16 may identify cardiac parameters of the cardiac signal (e.g., R-waves, and detect fibrillation based on the identified cardiac parameters).

In some examples, programmer 24 may be a handheld computing device or a computer workstation. Programmer 24 may include a user interface that receives input from a user. The user interface may include, for example, a keypad and a display, which may be, for example, a cathode ray tube (CRT) display, a liquid crystal display (LCD) or light emitting diode (LED) display. The keypad may take the form of an alphanumeric keypad or a reduced set of keys associated with particular functions. Programmer 24 can additionally or alternatively include a peripheral pointing device, such as a mouse, via which a user may interact with the user interface. In some embodiments, a display of programmer 24 may include a touch screen display, and a user may interact with programmer 24 via the display.

A user, such as a physician, technician, or other clinician, may interact with programmer 24 to communicate with IMD 16. For example, the user may interact with programmer 24 to retrieve physiological or diagnostic information from IMD 16. A user may also interact with programmer 24 to program IMD 16 (e.g., select values for operational parameters of IMD 16).

Programmer 24 may communicate with IMD 16 via wireless communication using any techniques known in the art. Examples of communication techniques may include, for example, low frequency or radiofrequency (RF) telemetry, but other techniques are also contemplated. In some examples, programmer 24 may include a programming head that may be placed proximate to the patient's body near the IMD 16 implant site in order to improve the quality or security of communication between IMD 16 and programmer 24.

In the example depicted in FIG. 1, IMD 16 is connected (or "coupled") to leads 18, 20, and 22. In the example, leads 18, 20, and 22 are connected to IMD 16 using the connector block 27. For example, leads 18, 20, and 22 are connected to IMD 16 using the lead connector ports in connector block 27. Once connected, leads 18, 20, and 22 are in electrical contact with the internal circuitry of IMD 16. Battery 26 may be positioned within the housing 40 of IMD 16. Housing 40 may be hermetically sealed and biologically inert. In some examples, housing 40 may be formed from a conductive material. For example, housing 40 may be formed from a material including, but not limited to, titanium, aluminum, stainless steel, among others.

Figure 3:
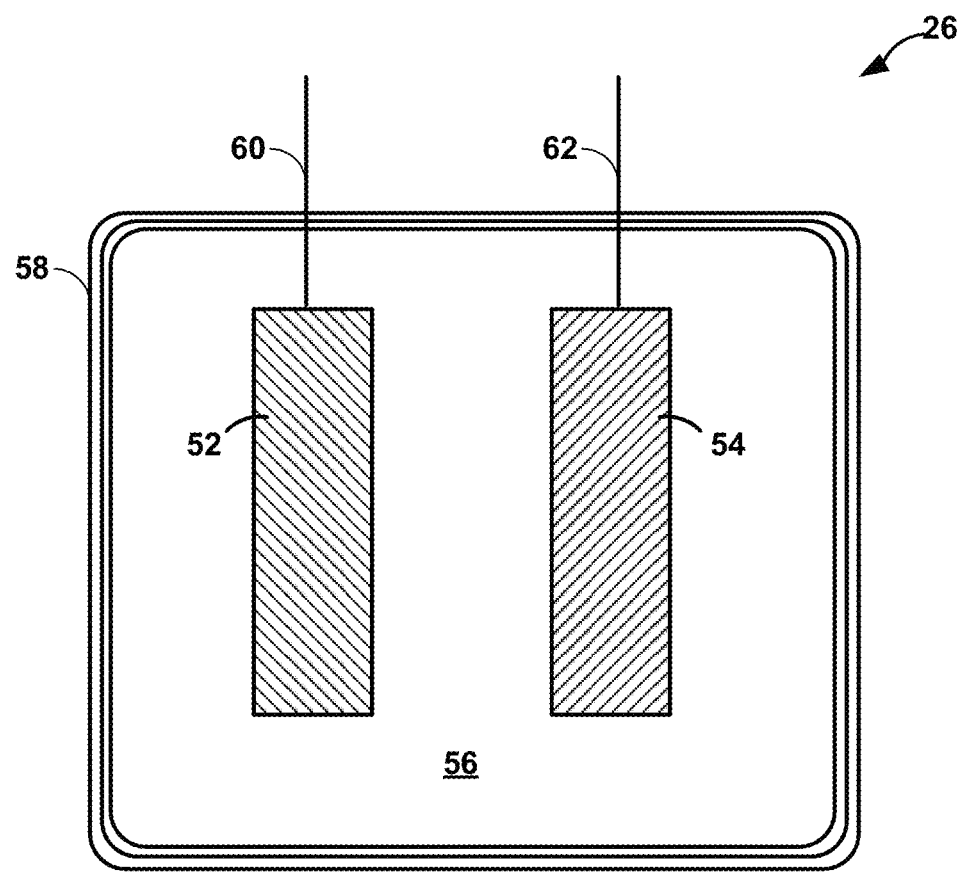
FIG. 3 is schematic diagram illustrating an example battery that may be used in a medical device.

FIG. 3 is a schematic diagram illustrating an example of battery 26 that may be used in IMD 16. As described above, battery 26 may be configured to supply power to one more electronic components of IMD 16. Battery 26 may be a lithium ion battery and includes first electrode 52, second electrode 54, and electrolyte 56. Multilayer battery enclosure 58 encloses these components of battery 26 to provide separation from the outside environment, e.g., the interior of housing 40 of IMD 16. Metal pins 60 and 62 are electrically coupled to electrodes 52 and 54, respectively, and extend through enclosure 58 to allow for electrical connection to components outside battery enclosure 58. Metal pins 60 and 62 may be wires or rods and may also comprise foil tabs, metalized polymer, or other suitable conductor such as a material comprising carbon or a conductive ceramic such as titanium nitride. Although battery 26 is described as a lithium ion battery, battery 26 may take the form of other types of batteries other than a lithium ion battery.

First electrode 52 and second electrode 54 may each include a metal substrate and any suitable electrode composition. For example, the electrode composition of first electrode 52 may be selected such that first electrode 52 defines an anode and electrode composition of second electrode 54 may be selected such that second electrode 54 defines a cathode of battery 26. The metal substrates of first and second electrodes 52, 54 may act as a current collectors and be a metal made from at least one of, but not limited to, aluminum, aluminum alloys, copper, copper alloys, titanium, titanium alloys, nickel, nickel alloys, and the like.

As seen in FIG. 3, electrolyte 56 may be provided intermediate or between anode electrode 52 and the cathode electrode 54. Electrolyte 56 may provide a medium through which ions (e.g., lithium ions) may travel. In one example, electrolyte 56 may be a liquid (e.g., a lithium salt dissolved in one or more non-aqueous solvents). In another example, the electrolyte 56 may be a lithium salt dissolved in a polymeric material such as poly(ethylene oxide) or silicone. In yet another example, the electrolyte may be an ionic liquid such as N-methyl-N-alkylpyrrolidinium bis(trifluoromethanesulfonyl)imide salts. In a further example, the electrolyte 56 may be a solid state electrolyte such as a lithium-ion conducting glass such as lithium phosphorous oxynitride (LiPON). Various other electrolytes may be used according to other examples. For example, the electrolyte 56 may be a 1:1 mixture of ethylene carbonate (EC) to diethylene carbonate (DEC) (EC:DEC) in a 1.0 molar (M) salt of lithium hexafluorophosphate ($LiPF_6$). Electrolyte 54 may include a propylene carbonate solvent and a lithium bis-oxalatoborate salt (sometimes referred to as LiBOB). The electrolyte 56 may comprise one or more of a polyvinylidene flouirde (PVDF) copolymer, a PVDF-polyimide material, and organosilicon polymer, a thermal polymerization gel, a radiation cured acrylate, a particulate with polymer gel, an inorganic gel polymer electrolyte, an inorganic gel-polymer electrolyte, a PVDF gel, polyethylene oxide (PEO), a glass ceramic electrolyte, phosphate glasses, lithium conducting glasses, lithium conducting ceramics, and an inorganic ionic liquid or gel, among others.

Although not shown FIG. 3, battery 26 may include a separator between the first electrode 52 and the second electrode 54. In one example, the separator is a polymeric material such as a polypropylene/polyethelene or another polyolefin multilayer laminate that includes micropores formed therein to allow electrolyte and lithium ions to flow from one side of the separator to the other.

Figure 4:
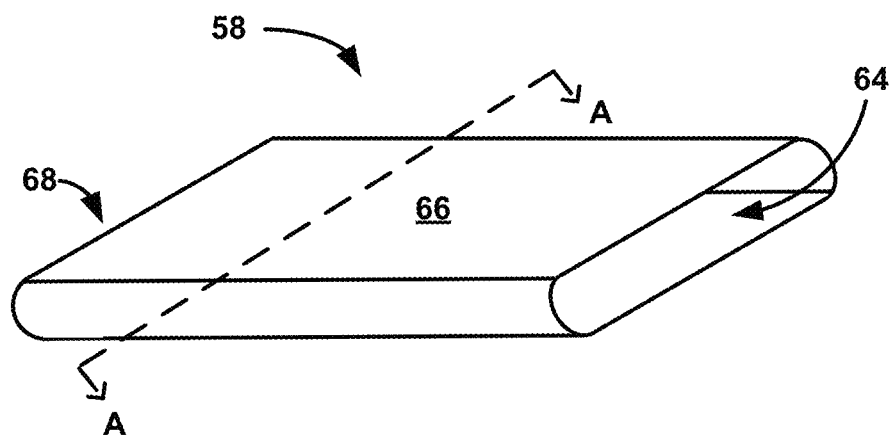
FIG. 4 is a conceptual diagram of an example multilayer battery enclosure.

Although not shown in FIG. 3, as described above, multilayer battery enclosure 58 may be formed from a substantially cylindrical member including a continuous (e.g., seamless) multilayer body defining a cavity between two ends. Battery enclosure 58 may be used to physically separate electrolyte 56 and electrodes 52, 54 of battery 26 from other components within housing 40 of IMD 16. In some examples, only a single end of battery enclosure 58 is sealed with the other end being continuous (e.g., seamless) with the cylindrical body, e.g., in the case of battery enclosure 58 initially having a pouch-like shape. In other examples, both ends of battery enclosure 58 may be initially open and subsequently sealed to enclose electrodes 52, 54 and electrolyte 56 of battery 26. For illustration, FIG. 4 is a conceptual diagram of an example multilayer battery enclosure 58 prior to being sealed to enclose electrodes 52, 56 and electrolyte 56 (not shown in FIG. 4) with enclosure 58. Multilayer battery enclosure 58 includes a substantially cylindrical member 66 having a substantially continuous (e.g., seamless) body defining a cavity 70 (labeled in FIG. 5, for example) between first end 64 and second end 68. The body of substantially cylindrical member 66 may be referred to as substantially continuous in the respect that the body may be formed without bonding or sealing portions of the body to form cylindrical member 66. For example, cylindrical member 66 may be formed by coextruding the desired material of the various layers into a cylindrical shape rather than wrapping a single sheet of foil into a cylinder and sealing the sheet along the length of the cylinder. In this manner, substantially cylindrical member 66 may be formed to have a substantially continuous body.

In the example of FIG. 4, first end 64 and second end 68 define openings into the cavity defined by substantially cylindrical member 66. As will be described below, to form a battery enclosure, one of first end 64 and second end 68 may be sealed (e.g., via thermal bonding or other suitable process) to form a sealed end of cylindrical member 66. After the one end is sealed, electrolyte 56 and electrodes 52, 56 may be inserted into cavity 70 defined by substantially cylindrical member 66, and the remaining open end of first end 64 and second end 68 may be sealed (e.g., via thermal bonding or other suitable process) to enclose electrolyte 56 and electrodes 52, 56 within battery enclosure 58.

Figure 5:
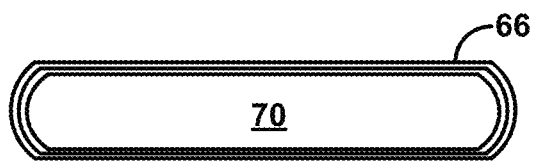
FIGS. 5 and 6 are conceptual diagrams illustrating example cross-sectional views of taken along A-A in FIG. 4.
Figure 6:
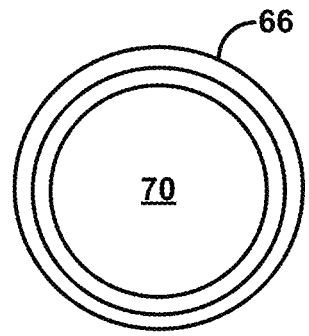

FIGS. 5 and 6 are conceptual diagrams illustrating example cross-sectional views of substantially cylindrical member 66 taken along A-A in FIG. 4. In each case, substantially cylindrical member 66 includes a substantially continuous body that defines inner cavity 70. As shown in FIGS. 5 and 6, the body of substantially cylindrical member 66 includes multiple layers and forms a continuous body without any seams, such as, those resulting from thermal bonding.

In general, substantially cylindrical member 66 may have any desired cross-section between ends 64 and 68, and is not limited to a substantially circular cross-section such as that shown in FIG. 6, or a substantially elliptical or oval cross-section shown in FIG. 5. In some examples, cylindrical member 66 may have an elongated oval cross-section with substantially flat top and bottom surfaces, e.g., to produce a substantially flat battery. In some examples, the length to width ratio of the cross-section may be greater than approximately 2:1, such as, e.g., between than approximately 5:1 and approximately 10:1. In some examples, the height of cylindrical member 66 cross-section may be less than approximately 7 millimeters (mm), such as, e.g., less than or equal to approximately 3 mm. In some examples, battery enclosure 58 may be designed such that the cross-section of substantially cylindrical member 66 is maintained after electrodes 52, 54, and electrolyte are enclosed and battery 26 is incorporated into IMD 16. In other examples, battery enclosure 58 may be designed such that the cross-section of substantially cylindrical member 66 is different than after electrodes 52, 54, and electrolyte 56 are enclosed and battery 26 is incorporated into IMD 16, e.g., substantially cylindrical member 66 may be compressed to flattening member 66 enclosure prior inserting electrodes 52, 54, and electrolyte 56. The final size and shape of battery 26, as defined by battery enclosure 56 may be dictated to some extent based on the size and shape of housing 40 as well as the other components within housing 40 of IMD 16.

Figure 7:
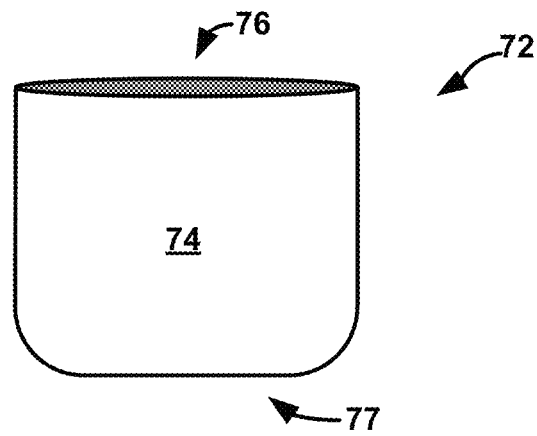
FIG. 7 is a conceptual diagram of another example multilayer battery enclosure.

FIG. 7 is a conceptual diagram illustrating another example multilayer battery enclosure 72 prior to being sealed to enclose electrodes 52, 54 and electrolyte 56. Battery enclosure 72 may be substantially similar to that of enclosure 58 of FIG. 4. Battery enclosure 72 includes a substantially cylindrical member 74 including continuous body defining a cavity (not labeled) between first end 76 and second end 77. However, unlike that of battery enclosure 58 shown in FIG. 4, only first end 76 defines an opening into the cavity of substantially cylindrical member 74. Second end 77 is closed and is integral and continuous (e.g., seamless) with the continuous body of substantially cylindrical member 74. In such a case, battery enclosure 72 may be described as having a "pouch-like shape" or being "pouch shaped." Such a pouch shaped battery enclosure may only require first end 76 to be sealed enclose electrolyte 56 and electrodes 52, 54 within battery enclosure 72. As described above, to form battery enclosure 72, a coextruded substantially cylindrical structure may be blow-molded to provide a pouch-like shape in which only first end 76 is open. Second end 77 end may define a substantially flat end or other desired shape, and may be shaped to correspond to a volume within housing 40 of IMD 16. In one examples, second end 77 may define a round end, e.g., for use in an IMD that has a rounded-profile.

Figure 8A:
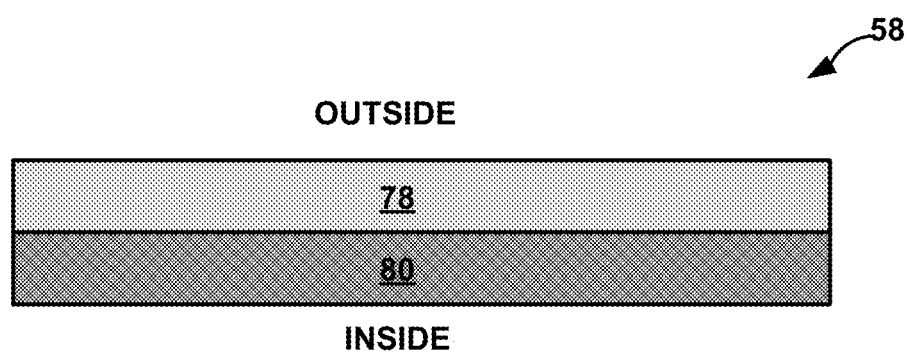
FIGS. 8A-8C are cross-sectional diagrams of various example multilayer battery enclosures.
Figure 8B:
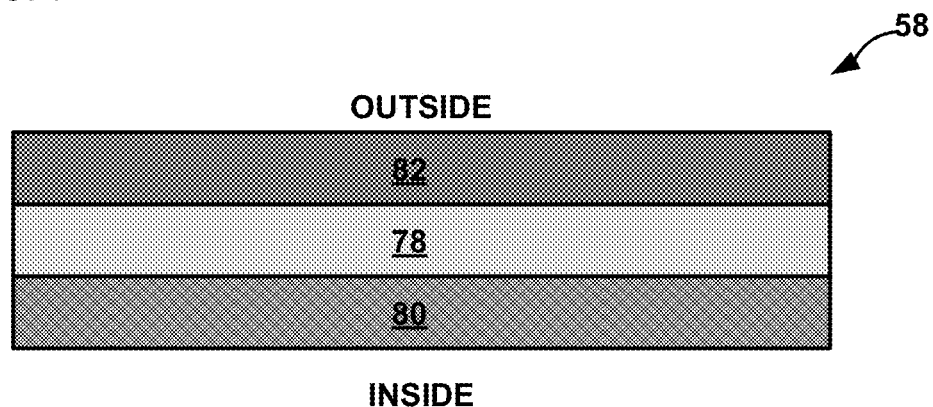
Figure 8C:
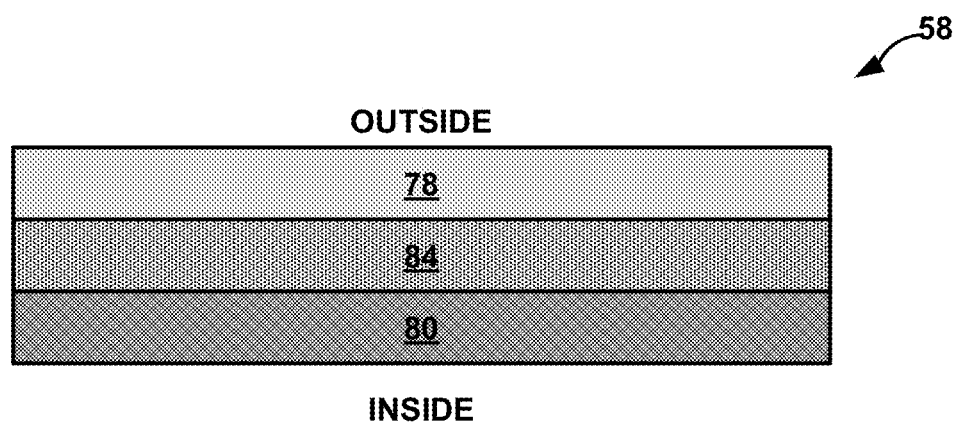

FIGS. 8A-8C are cross-section diagrams of various example multilayer battery enclosure 58. In FIGS. 8A-8C, the labels "INSIDE" and "OUTSIDE" are used to denote the interior and exterior surfaces, respectively, of battery enclosure 58.

As shown FIG. 8A, battery enclosure 58 may include barrier layer 78 and inner layer 80. Inner layer 80 may be formed of a material compatible with the electrolyte material of battery 26. For example, the material of inner layer 80 may be selected to avoid physical and/or chemical degradation through electrolyte contact. In some examples, inner layer 80 may be substantially insoluble and chemically non-reactive with electrolyte 56. In some examples, inner layer 80 may be substantially impermeable to electrolyte 56. In one example, inner layer 80 may be formed of a polyolefin when a lithium ion electrolyte is used. Inner layer 80 may also be a material that is thermally or otherwise bondable. For example, in some cases, an opening at one or more ends of enclosure 58 may be sealed via thermal bonding by bonding opposing surfaces of an opening of enclosure 58 together. In such cases, to form the seal, the material of inner surface 80 may need to be thermally bondable to itself In the case of an end cap, inner surface 80 may be formed of a material that may be bonded to the material of the opposing surface of the end cap, which may be the same or different than the material of inner layer 80. Examples of material used to form inner layer 80 may include polyolefins (such as, e.g., polyethylene, polypropylene), tefzel, and/or styrene butadiene copolymer, polyphenylene sulfide, polyether ether ketone, and liquid crystal polymers.

Barrier layer 78 may be formed of a material that reduces or substantially eliminates moisture, oxygen, and/or electrolyte permeation into battery enclosure 58. In some examples, barrier layer 78 may be substantially impermeable to moisture, oxygen, and the electrolyte within enclosure 58. In some examples, barrier layer 78 may exhibit relatively low solubility to oxygen and moisture. In some examples, barrier layer 78 may exhibit oxygen permeability of less than approximately 1 Barrer, such as, e.g., less than approximately 0.01 Barrer. In some examples, barrier layer 78 may exhibit water permeability of less than approximately 1 Barrer, such as, e.g., less than approximately 0.01 Barrer. Protection against moisture and/or oxygen permeation may prevent against the introduction of moisture and/or oxygen into the interior cavity of battery enclosure 58, e.g., during shipping or storage of battery 26 prior to be incorporated in IMD 16. Additionally, barrier layer 80 may be formed of a material that provides a desired level of wear and puncture resistance to enclosure 58, and may be a material capable of being bonded to other components within housing 40 of IMD 16. Examples of barrier material include PEEK, polyimide, polyolefins (such as polypropylene or polyethylene), liquid crystal polymer, poly (propylene sulfide) (PPS), Ethylene Vinyl Alcoho (EvOH), cyclic olefinic copolymers (COC), particulate-filled (e.g., mica flakes) polymers, or metalized polymers.

As shown in FIG. 8B, layer 82 may be employed as an optional outer layer to provide additional mechanical strength (e.g., tensile and/or abrasion resistance) to multilayer enclosure 58. Examples of materials that may be used for outer layer include polyamide, such as, e.g., nylon. While layer 82 is shown at the outer layer of enclosure 82, in some examples, layer 82 may be provided as an intermediate or inner layer.

As shown in FIG. 8C, enclosure 58 may additionally or alternatively includes bond layer 84 (also referred in some cases as a tie layer) between barrier layer 78 and inner layer 80. Bond layer 84 may be employed in cases in which the compositions of barrier layer 78 and inner layer 80 prevent the direct adhered to each other. In such a case, the composition of bond layer 84 may allow for adherence to barrier layer 78 and inner layer 80. In some examples, similar to that of barrier layer 78, bond layer 84 may also be substantially impermeable to moisture and oxygen. In some examples, bond layer 84 may be formed of a polyolefin, such as, polyethylene or polypropylene, that have been functionally modified to bond inner layer 80 and barrier layer 78 in case in which the composition of the layers is dissimilar.

Layer of battery enclosure 58 may define any suitable thickness. For reasons of maximizing energy density, in some examples, the multilayer structure of battery enclosure may be formed as thin as possible while still retaining required physical barrier and mechanical durability properties. In some examples, the overall thickness of the layers may be less than approximately 1 mm, e.g., less than 0.5 mm. In some examples, inner layer 80 may be thicker than barrier layer 78.

As described above, multilayer battery enclosures 58 and 72 may be fabricated using any suitable technique. In some examples, suitable materials may be coextruded to form a multilayer, substantially cylindrical structure having a hollow center. Such a multilayer structure may be used to form a single multilayer battery enclosure initially having first and second open ends that may be sealed, or the structure may be later cut to form a plurality of such battery enclosure having the same or varying lengths. In some examples, the coextruded substantially cylindrical structure may be blow-molded to form a battery enclosure having on a single open end (e.g., battery enclosure 72) for sealing after the electrodes and electrolyte have been introduced into the cavity of the battery enclosure.

Figure 9:
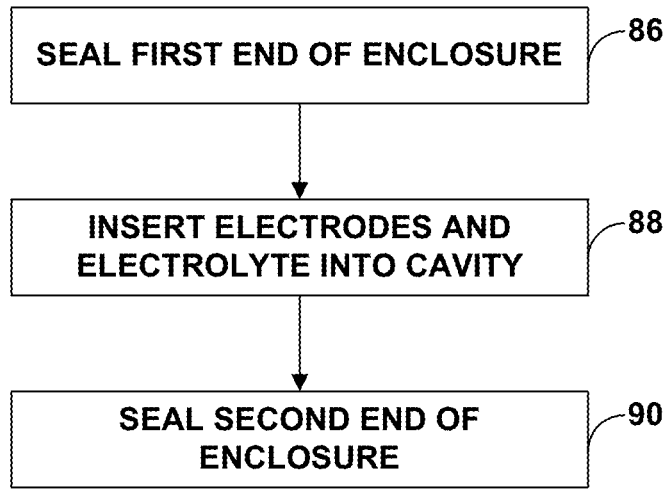
FIGS. 9 and 10 are flow diagrams illustrating example techniques for fabricating example batteries.
Figure 11:
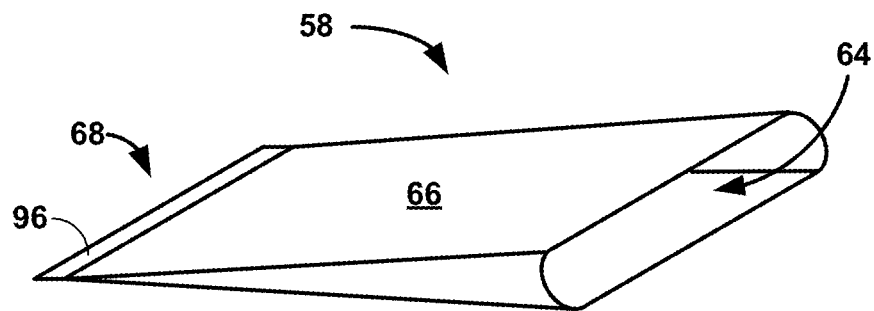
FIGS. 11-13 are conceptual diagrams illustrating various example multilayer battery enclosures.

FIG. 9 is a flow diagram illustrating an example technique for assembling battery 26 including multilayer battery enclosure, such as battery enclosure 58. As previously described with regard to FIG. 4, multilayer battery enclosure 58 includes a substantially cylindrical member 66 having a substantially continuous (e.g., seamless) body defining a cavity 70 (labeled in FIG. 5, for example) between first end 64 and second end 68. Starting with battery enclosure 58 in the configuration shown in FIG. 4, the opening defined by second end 68 may be sealed to form seam 96 (86). The configuration of battery enclosure 58 after second end 68 has been sealed (86) is shown in FIG. 11. Any suitable technique may be used to seal second end 68. In some examples, thermal and/or pressure sealing techniques may be used to adhere the opposing inner surfaces of second end 86 to each other. In some cases, a portion of second end 86 may be folded back onto itself, and then the fold may be sealed to form seam 96. Other than heat sealing, a seal may be formed by local application of energy in the form of ultrasound or a laser bearm. Sealant materials may also be applied to the joint, either between the layers to be joined, or just outside of the joint, for the purposes of a mechanical bond and/or reducing permeation of electrolyte, water or moisture. Examples sealant materials may include thermoplastic polyolefins and polyolefin elastomers such as PE, PP, poly(isobutene), EPDM (ethylene propylene diene monomer based rubber), and the like.

Figure 12:
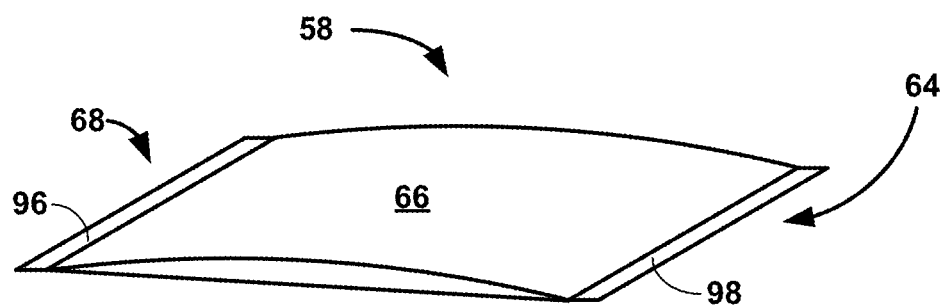

Once the second end 68 has been sealed (86), electrodes 52, 54, electrolyte 56, and any other internal components of battery 26 may be inserted into cavity 70 defined by substantially cylindrical member 66 via the opening at first end 64 (88). Once inserted, the opening defined by first end 64 may be sealed to form seam 98 (90). First end 64 may be sealed using any suitable technique including those used to seal second end 68. Once first end 64 is sealed, substantially cylindrical member 66 of battery enclosure 58, in combination with sealed first end 64 and sealed second end 68 may enclose electrodes 52, 54, electrolyte 56, and any other internal components of battery 26, as shown in FIG. 12. Although not shown in FIG. 12, when assembled, battery 26 may include metal pins 60 and 62 (FIG. 3) extending from the inside of battery enclosure 58 to the outside of battery enclosure 58.

Figure 13:
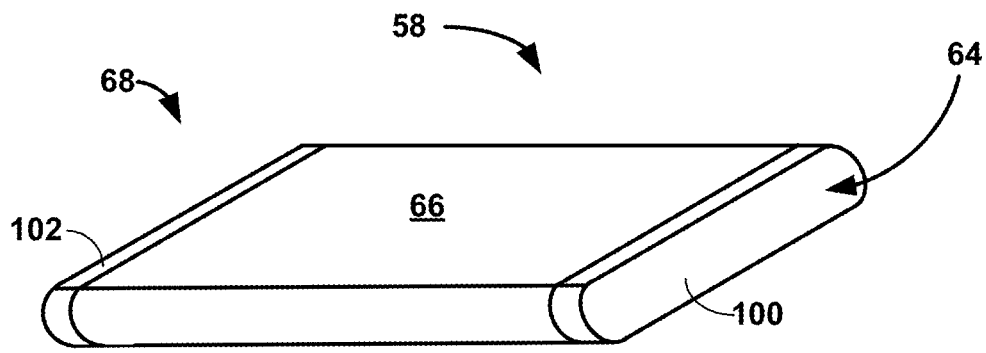

In some examples, the opening of first and/or second ends 64, 68 may be sealed using end caps. For example, as shown in FIG. 13, the opening of first end 64 is sealed via first end cap 100 and the opening of second end 68 is sealed by second end cap 102. In each case, end caps 100, 102 are configured to be bonded or other attached to cylindrical member 66 to cover the respective open ends. In some examples, end caps 100, 102 may be attached in place at ends 64, 68, respectively, via thermal bonding or other suitable technique. In some examples, end caps 100, 102 may be attached in place at ends 64, 68, respectively, via laser welding, polymer to polymer welding, and/or heat sealing. In some examples, first and second end caps 100, 102 may be used to seal the openings at first and second ends 64, 68, respectively, for cases in which it is desired for battery enclosure 66 to maintain the non-flat cross-section rather than being compressed to a substantially flat shape. Endcaps 100, 102 may be a single layer or multilayer material, e.g., a multilayer material substantially the same as that of cylindrical member 66. In some examples, end caps 100, 102 may be thicker than cylindrical component without sacrificing energy density significantly. In one or both ends, end caps 100, 102 may include integrated feedthroughs, e.g., to form pins 60 and 62. In one example, end caps 100, 102 may be molded polymer bodies or metallic member. In some examples, end caps 100, 102 may be formed of conductive material and be electrically coupled one or more of electrodes 52, 54, e.g., to allow end caps 100, 102 to function as pins 60, 62.

Figure 10:
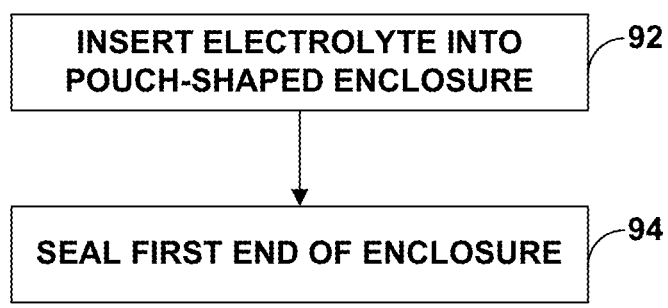

FIG. 10 is a flow diagram illustrating an example technique for assembling battery 26 including multilayer battery enclosure, such as battery enclosure 72. As previously described with regard to FIG. 7, battery enclosure 72 includes a substantially cylindrical member 74 including continuous body defining a cavity (not labeled) between first end 76 and second end 77. However, unlike that of battery enclosure 58 shown in FIG. 4, only first end 76 defines an opening into the cavity of substantially cylindrical member 74. Second end 77 is closed and is integral and continuous (e.g., seamless) with the continuous body of substantially cylindrical member 74. In such a case, battery enclosure 72 may be described as having a "pouch-like shape" or being "pouch shaped."

Starting with battery enclosure 72 in the configuration shown in FIG. 7, electrodes 52, 54, electrolyte 56, and any other internal components of battery 26 may be inserted into cavity 70 defined by substantially cylindrical member 74 via the opening at first end 76 (92). Once inserted, the opening defined by first end 76 may be sealed (94). First end 76 may be sealed using any suitable technique including those described above with regard to the example technique of FIG. 9. Once first end 76 is sealed, substantially cylindrical member 74 of battery enclosure 72, in combination with sealed first end 76 and integrally formed second end 77 may enclose electrodes 52, 54, electrolyte 56, and any other internal components of battery 26. When assembled, battery 26 may include metal pins 60 and 62 (FIG. 3) extending from the inside of battery enclosure 72 to the outside of battery enclosure 72. Once assembled, battery 26 may be incorporated into IMD 16 or other suitable medical device, e.g., to supply energy to one or more electronic components of IMD 16.

Various examples have been described in the disclosure. These and other examples are within the scope of the following claims.

The invention claimed is:

1. A battery comprising:
 a first electrode;
 a second electrode;
 an electrolyte;
 a multilayer battery enclosure, wherein the multilayer battery enclosure comprises a substantially cylindrical member including a continuous multilayer body defining a cavity between a first end and a second end,
 wherein the multilayer battery enclosure comprises a coextruded, multilayer battery enclosure absent of seams beyond the first end and the second end;
 a first seal at the first end to seal the first end; and
 a second seal at the second end, wherein the first seal and the second seal combine to enclose the first electrode, second electrode, and the electrolyte within the cavity of the multilayer battery enclosure.

2. The battery of claim 1, wherein the multilayer battery enclosure includes an inner layer and a barrier layer.

3. The battery of claim 2, wherein the inner layer is formed of a material that is substantially insoluble with the electrolyte.

4. The battery of claim 2, wherein the multilayer battery enclosure includes an outer layer separated from the inner layer by the barrier layer.

5. The battery of claim 2, wherein the multilayer battery enclosure includes a bond layer bonding the inner layer to the barrier layer.

6. The battery of claim 2, wherein the inner layer is substantially insoluble with the electrolyte.

7. The battery of claim 2, wherein the inner layer comprises at least one of polyethylene or polypropylene.

8. The battery of claim 2, wherein the barrier layer exhibits an oxygen and water permeability less than approximately 1 Barrer.

9. The battery of claim 2, wherein the barrier layer comprises at least one of PEEK, polyimide, polyolefins, liquid crystal polymer, poly(propylene fumarate), Ethylene Vinyl Alcoho (EvOH), cyclic olefinic copolymers, particulate-filled polymer, or metalized polymer.

10. A battery comprising:
a first electrode;
a second electrode;
an electrolyte;
a multilayer battery enclosure, wherein the multilayer battery enclosure comprises a substantially cylindrical member including a continuous multilayer body defining a cavity between a first end and a second end,
wherein the multilayer battery enclosure comprises a coextruded, multilayer battery enclosure absent of seams beyond the first end and the second end,
wherein the multilayer battery enclosure is non-metallic;
a first seal at the first end to seal the first end; and
a second seal at the second end, wherein the first seal and the second seal combine to enclose the first electrode, second electrode, and the electrolyte within the cavity of the multilayer battery enclosure.

11. The battery of claim 1, wherein the continuous multilayer body comprises a substantially tubular member that extends between the first seal and the second seal.

12. The battery of claim 1, wherein the substantially cylindrical shape defines a substantially circular cross section, substantially elliptical cross-section, or oval cross section with substantially flat sides.

13. The battery of claim 1, wherein the battery enclosure further comprises at least one end cap sealing at least one the first end and second end of the enclosure.

14. The battery of claim 1, wherein the battery comprises a lithium ion battery.

15. A medical device comprising:
an outer housing; and
a battery within the outer housing, wherein the battery is configured to supply power to one or more electronic components of the medical device, wherein the battery comprises:
a first electrode;
a second electrode;
an electrolyte;
a multilayer battery enclosure, wherein the multilayer battery enclosure comprises a substantially cylindrical member including a continuous multilayer body defining a cavity between a first end and a second end,
wherein the multilayer battery enclosure comprises a coextruded, multilayer battery enclosure absent of seams beyond the first end and the second end;
a first seal at the first end to seal the first end; and
a second seal at the second end, wherein the first seal and the second seal combine to enclose the first electrode, second electrode, and the electrolyte within the cavity of the multilayer battery enclosure.

16. The medical device of claim 15, wherein the multilayer battery enclosure includes an inner layer and a barrier layer.

17. The medical device of claim 16, wherein the inner layer is formed of a material that is substantially insoluble with the electrolyte.

18. The battery of claim 1, wherein at least one of the first seal and the second seal is a seam in the continuous multilayer body.

19. The battery of claim 1, wherein at least one of the first seal and the second seal is a seam in the continuous multilayer body sealed via a thermal bond.

* * * * *